Figure 1:
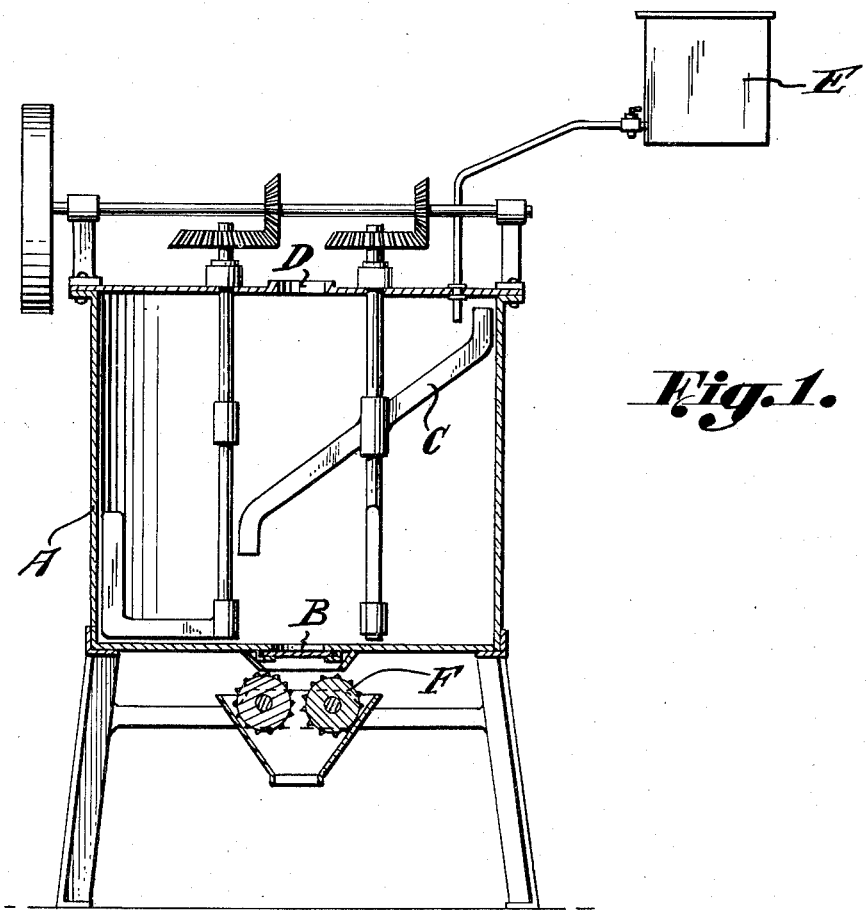

Aug. 29, 1939.  P. SMIT  2,171,408
ACTIVE CARBONACEOUS MATERIALS
Filed Sept. 17, 1935  2 Sheets-Sheet 1

Inventor,
P. Smit
By Glascock Downing & Seebold
Attys.

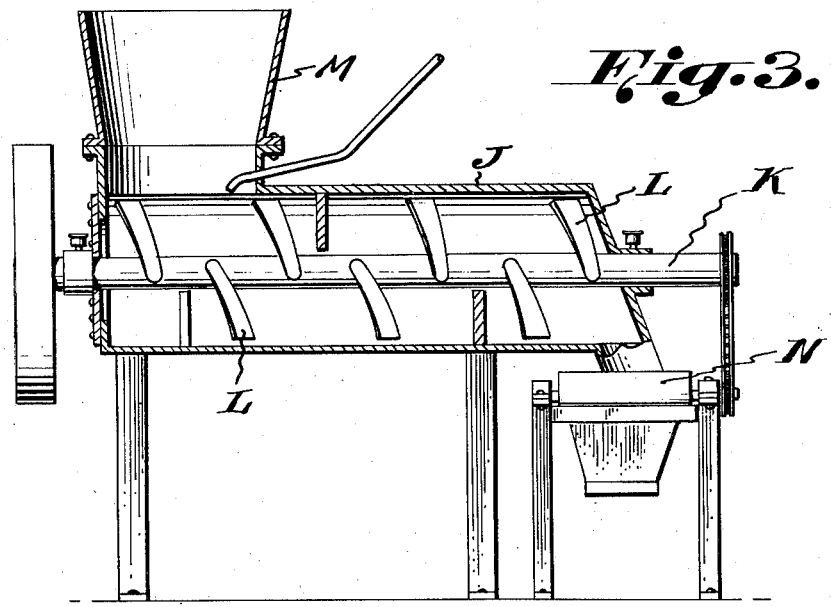

Patented Aug. 29, 1939

2,171,408

UNITED STATES PATENT OFFICE 2,171,408

ACTIVE CARBONACEOUS MATERIALS

Pieter Smit, Amsterdam, Netherlands, assignor to N. V. Octrooien Maatschappij "Activit", Amsterdam, Netherlands Application September 17, 1935, Serial No. 40,917
In France September 26, 1934

5 Claims. (Cl. 252—3)

My invention relates to catalysts, more especially of the large surface type, which is represented for instance by the so-called active carbon, and more especially to a carbonaceous material of great activity possessing certain properties of a colloid.

It is an object of my invention to provide means for producing, in a particular simple and effective manner, a material of the kind aforesaid, which is more efficient and better adapted for practical use than similar active materials hitherto known.

Active carbon and other inert catalytic materials have frequently been used for decoloration and the removal of offensive taste and smell in liquid matter of all kinds. Hitherto active carbon is mostly prepared by acting on coal or other carbon with certain gases at a high temperature. Alternatively coal or the like has been impregnated with chemicals, which, when subjected to the action of a high temperature, are imparted activating properties. Steam, carbon dioxide, oxygen and chlorine have for instance been made to react with the carbon, and of the chemicals used for impregnating the coal lime, caustic alkalies, zinc chloride, sulfuric acid and the like may be mentioned. The treatment of the carbon with such gases or chemicals brings about a great porosity of the carbon, whereby to this latter is imparted a very large surface. The porous carbon thus produced practically exerts only an absorptive action, but no chemical activity, being substantially inert. In preparing it, care is taken to raise the temperature as far as possible in order to produce a carbon product of greatest purity. When acting on the carbon with one of the gases mentioned above, the temperature is as a rule raised to about 800–1100° C. When operating with impregnation, lower temperatures are used, since the action of the chemicals in question leads to a very fine subdivision of this material. However also in the practice of this method a very high end temperature is reached.

I have now found that by changing the conditions, under which water-absorbing chemicals react with carbonaceous materials, a catalyst possessing colloidal properties can be produced. To this end I cause the water-absorbing chemical to mix with the carbonaceous material so intimately and with such intensity that a practically instantaneous reaction is brought about between the two reactants and that a similarly instantaneous rise of temperature up to 200–250° C. as a maximum takes place.

I succeed in bringing about such intimate and intensive intermingling of the reactants for instance by spraying the water-absorbing material, such as concentrated sulfuric acid, in very fine subdivision on the carbonaceous material. Alternatively I may intimately mix the two substances or atomize them in such a manner as to cause an intermingling thereof, whereby the reaction between them is brought about.

I may use any kind of carbonaceous material and amongst others such as have already served in the purification of liquids. Such substances are regenerated by this treatment.

In my copending application for patent of the United States, Serial No. 1,265, filed January 10, 1935, I have described a method of acting on carbonaceous material such as saw dust, wood meal, sugar, coal and the like with water-absorbing chemicals including for instance sulfuric acid or zinc chloride or calcium chloride, thereby producing a product possessing particular properties, for instance a high ion-exchanging capacity. In operating according to the manner aforesaid, I obtain a material possessing a predetermined structure which renders it particularly adapted for filtering under the form of layers.

In contradistinction thereto the material obtained according to the present invention does not possess an outspoken structure, but can very readily be finely subdivided. While it is characterised by favorable decoloring and absorbing properties, its most characteristic property is that of separating out the colloidal matter forming part of the solutions and other liquids to be filtered, and which render filtration very difficult and are the cause of froth formation. The new material obtainable according to this invention further possesses a high ion-exchanging capacity. It lends itself with particular advantage to the improving of the properties of the soil, quite especially in view of its ion-exchanging properties, whereby all kinds of salts and fertilizing matter in general are fixed in the soil. It is further possible to bring the constituents of this material into a combination whereby a valuable fertilizer is formed. For instance, when treating the carbonaceous material with sulfuric acid or phosphoric acid, these acids may be fixed by combining them with ammonia or magnesium.

The new material, after having been used for decoloration or other technical purposes, if mixed for instance with calcium compounds, will possess great fertilizing properties.

A further great advantage consists therein that the new product can be produced at very low cost, since only a small quantity of water-absorbing chemicals is required and since in most cases outside heating in order to bring about the reaction is superfluous.

The sugar and glucose producing industries are particularly interested in an active material of this kind. In order to render same fit for use for these purposes, care should be taken not to unnecessarily dilute the water-absorbing material such as sulfuric or phosphoric acid. In any case these materials, after having been preheated, on being mixed with the carbonaceous material must be capable of reacting with it directly and causing the temperature to rise quickly.

Although the material does not possess a very outspoken structure, provided that it is not subdivided too finely, it may be very useful for the purpose of filtration in a layer, similarly as bone black is used. In this case operation in countercurrent may be made use of, whereby a very great economy in the use of the active matter is obtained. This treatment is, however, impracticable in cases where the liquid shows a great tendency to disperse the active material.

If the process is carried out under a certain pressure above normal by preventing the gases developed in the reaction from escaping freely, the quantity of chemicals required to form the desired product may be kept low, since under the action of a certain pressure above normal the impregnation of the carbonaceous material is facilitated and improved. In order to obtain this I prefer causing the reaction to proceed in a vessel or chamber which is almost or altogether closed.

I have found it useful, in order to obtain a highly active product, to provide for a rise in temperature such that the secondary condensable products formed in the reaction are at least partly volatilised, since otherwise they would render the product impure.

The preparation of a highly active material according to this invention requires only little time, as a rule not more than about ten minutes. I have found that fine grinding of the mass, while it is still hot, i. e. directly after preparation, is advantageous for the production of an altogether homogeneous product, and this more particularly in those cases where the carbonaceous material was not employed in high subdivision, for instance when acting on coarse wood meal.

Apart from the properties mentioned above the active carbonaceous material prepared in accordance with the present invention further possesses the following properties which must be taken into account when putting it to practical use. It undergoes a dispersion in pure liquids of alkaline reaction, whereby these liquids are colored. The presence of impurities in the liquid, for instance of albuminous matter, of dissolved materials, etc., may prevent such dispersion from arising, and in these cases the active carbonaceous material will exert a purifying action on the liquid. This dispersion is also counteracted by the formation of a precipitate or by the binding of the chemicals present in the active material, and further by the presence of organic or inorganic reducing agents.

I have further found that dispersion of the active material is also counteracted by admixing to it or simultaneously adding insoluble material such as earth, coal (more especially active coal), kieselguhr, fibrous matter, colloidal or suspended precipitates, flocculated albuminous matter and the like, but also dissolved materials such as sodium chloride, calcium chloride, soluble albuminous matter, saponines, organic or inorganic reducing agents, etc., will act in a similar way.

Whenever the active material contains sodium, potassium or ammonium as exchangeable cations, dispersion will take place readily. Therefore, when purifying liquids which do not contain any constituents capable of counteracting such dispersion, it is desirable to replace these cations by others, for instance by bringing the active material in contact with a solution of such other cations.

In order to be able to prepare the active material in the most economical manner, I may use apparatus of different character. I may operate the process of preparation in a continuously or discontinuously actuated mixing apparatus, but in all cases care must be taken to prevent the formation of lumps in the reaction mass. A vertical or horizontal double-armed stirring and mixing device may be used, in which the arms cooperate with edged ledges. Preferably the mixing device should be connected directly with a grinding mill or other subdividing apparatus.

In the drawings affixed to this specification and forming part thereof apparatus suitable for the carrying out of this invention are illustrated diagrammatically by way of example. In the drawings Figs. 1 and 3 are axial sections, and Fig. 2 is a perspective view, of a mechanical mixer which may be used in the operation of the process, while Fig. 4 illustrates an apparatus for mixing the substances designed to react with each other by atomization.

Referring to the drawings and first to Fig. 1, A is the mixing vat, B is a bottom slide for the exhausting of the contents, C is one of the stirring and mixing arms, D is the opening for introducing the material, E is a container for the liquid reactant and F is a mill.

Figure 2:
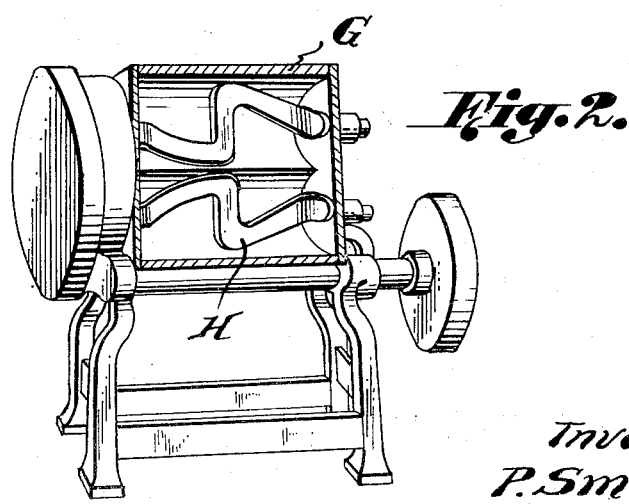

In Fig. 2 G is the mixing vat, while H is one of the mixing arms.

In Fig. 3 J is the mixing vat, K a horizontal shaft, L are the mixing arms fixed to the shaft, M is a hopper and N a receiver.

In Fig. 4 O is the atomizer vessel, P and R are containers for sulfuric acid and molasses under pressure, respectively, S and T are two atomizer nozzles, U and V are pipes leading from the containers P and R to the nozzles S and T, respectively, W is a vent for the gases developed in the reaction, which may pass through a dust separator, and X is a burner serving to heat up the air in the apparatus before starting the operation.

In the preparation of a material according to this invention I may for instance proceed as follows:

*Example 1.*—120 litres saw dust or wood meal are mixed in a mixer, for instance such as shown in Fig. 1, with 40 litres sulfuric acid of 66° Bé. After the lapse of a few minutes the temperature rises to about 150° C. and about 10% by weight of the reactants escapes in the form of gases. At the end of ten minutes the mass, while still hot, is allowed to pass through the mill to be ground therein.

*Example 2.*—120 litres wood meal are mixed with 70 to 100 litres sulfuric acid of 60° Bé., which has been preheated to about 130° C. A vigorous reaction sets in, the temperature of the mixture rising to 150° C.

*Example 3.*—180 litres wood meal or saw dust are mixed with a saturated solution of zinc chloride preheated to 120° C. At the end of ten minutes the mass is passed through the grinding mill.

*Example 4.*—To the mass prepared in accordance with Example 1 20 kgs. active carbon are added, before the mass is ground, and the mixture is then passed through the grinding mill.

*Example 5.*—To the mass prepared according to Example 1 60 kgs. dried and finely ground clay are added, and the mass is then ground.

*Example 6.*—Molasses preheated to 80° C. and sulfuric acid of 66° Bé. are atomized in an apparatus such as illustrated in Fig. 4, in the proportion of one part by volume sulfuric acid to 0.5–1.5 parts molasses in such a manner that the atomized substances thoroughly penetrate each other. In the operation of this process about ten parts of a flaky active material are formed instantaneously.

Various changes may be made in the details disclosed in the foregoing specification without departing from the invention or sacrificing the advantages thereof.

I claim:

1. In the manufacture of catalytically active carbonaceous materials having colloidal properties, the process which comprises finely subdividing a solid carbonaceous material, which has the property of yielding carbon when subjected to dry distillation, and quickly mixing the finely subdivided product with concentrated sulfuric acid having a concentration of over approximately 60° Bé., the rate and conditions of mixing being such that the formation of lumps is avoided, that an instantaneous reaction is produced throughout the whole mass which is completed to give a final product within a period not exceeding 10 minutes and that a substantially instantaneous rise in temperature to a maximum of not below 150° C. and not substantially above 250° C. is caused, whereby a rapid volatilization of secondary condensable products formed in the reaction takes place.

2. The process of claim 1 wherein the acid used is sufficiently concentrated to produce said reaction when mixed with said carbonaceous material at room temperatures.

3. The process of claim 1 wherein the acid used is preheated prior to admixture with the carbonaceous material to temperatures sufficiently high to produce the described reaction.

4. The process of claim 1 wherein said reaction is conducted in a closed reaction zone preventing the escape of the volatilized products.

5. The process of claim 1 wherein the solid products resulting from the reaction are ground while still hot.

PIETER SMIT.